US011928572B2

(12) United States Patent
Sawaf et al.

(10) Patent No.: US 11,928,572 B2
(45) Date of Patent: Mar. 12, 2024

(54) MACHINE LEARNING MODEL GENERATOR

(71) Applicant: aixplain, Inc., Los Gatos, CA (US)

(72) Inventors: Hassan Sawaf, Los Gatos, CA (US); Marios Anapliotis, Sausalito, CA (US); Fady El-Rukby, Redmond, WA (US)

(73) Assignee: Aixplain, Inc., Los Gatos, CA (US)

( * ) Notice: Subject to any disclaimer, the term of this patent is extended or adjusted under 35 U.S.C. 154(b) by 285 days.

(21) Appl. No.: 17/219,714

(22) Filed: Mar. 31, 2021

(65) Prior Publication Data

US 2022/0318682 A1 Oct. 6, 2022

(51) Int. Cl.
*G06N 20/20* (2019.01)
*G06F 40/20* (2020.01)
*G06N 5/043* (2023.01)

(52) U.S. Cl.
CPC .......... *G06N 20/20* (2019.01); *G06F 40/20* (2020.01); *G06N 5/043* (2013.01)

(58) Field of Classification Search
None
See application file for complete search history.

(56) References Cited

U.S. PATENT DOCUMENTS

| 10,776,686 | B1* | 9/2020 | Jacob | G06N 3/08 |
| 2018/0053233 | A1* | 2/2018 | Srivastava | G06F 16/2455 |
| 2018/0067732 | A1* | 3/2018 | Seetharaman | G06F 3/0649 |
| 2018/0336045 | A1* | 11/2018 | Badr | G06V 20/00 |
| 2019/0361697 | A1* | 11/2019 | Hu | G06F 8/433 |
| 2021/0192401 | A1* | 6/2021 | Chandrasekaran | G06Q 10/06 |

FOREIGN PATENT DOCUMENTS

WO WO-2021051031 A1 * 3/2021 .......... G06F 11/3003

* cited by examiner

*Primary Examiner* — Alan Chen
(74) *Attorney, Agent, or Firm* — Flagship Patents; Sikander M. Khan

(57) ABSTRACT

A method includes receiving information associated with a requested operator. The method further includes, in response to receiving the information, generating, by a processing device executing a machine learning model, an artificial intelligence (AI)-based solution to the requested operator, wherein the AI-based solution comprises a plurality of machine-learning models. The method further includes displaying an option to access the AI-based solution in a marketplace platform. The method further includes receiving information associated with a requested operator, and generating, by a processing device executing a first machine learning model, a skeleton architecture of an AI-based solution to the operator based on the information.

14 Claims, 9 Drawing Sheets

MACHINE LEARNING MODEL GENERATOR

CROSS REFERENCE TO RELATED APPLICATIONS

This application is related to U.S. application Ser. No. 17/219,699 for MACHINE LEARNING MODEL GENERATION PLATFORM filed concurrently herewith, and to U.S. application Ser. No. 17/219,723 for MACHINE LEARNING MODEL AGGREGATOR filed concurrently herewith.

TECHNICAL FIELD

Aspects of the present disclosure relate to the field of machine learning and more specifically, to a machine learning model generation platform.

BACKGROUND

In computing, machine learning (ML) is a category of computer algorithms that improve automatically through experience. Machine learning may be seen as a subset of artificial intelligence (AI). Machine learning algorithms build a model based on sample data, known as "training data", in order to make predictions or decisions without being explicitly programmed to do so. Machine learning algorithms are used in a wide variety of applications, such as email filtering and computer vision, where it is difficult or unfeasible to develop conventional algorithms to perform the needed tasks.

Performing machine learning operations involves creating a model, which is trained on some training data and then can process additional data to make predictions. Various types of models have been used and researched for machine learning systems. Types of models may include, for example, artificial neural networks, decision trees, support vector machines, regression analysis, Bayesian networks, and genetic algorithms.

BRIEF DESCRIPTION OF THE DRAWINGS

The described embodiments and the advantages thereof may best be understood by reference to the following description taken in conjunction with the accompanying drawings.

These drawings in no way limit any changes in form and detail that may be made to the described embodiments by one skilled in the art without departing from the spirit and scope of the described embodiments.

DETAILED DESCRIPTION

Figure 1A:
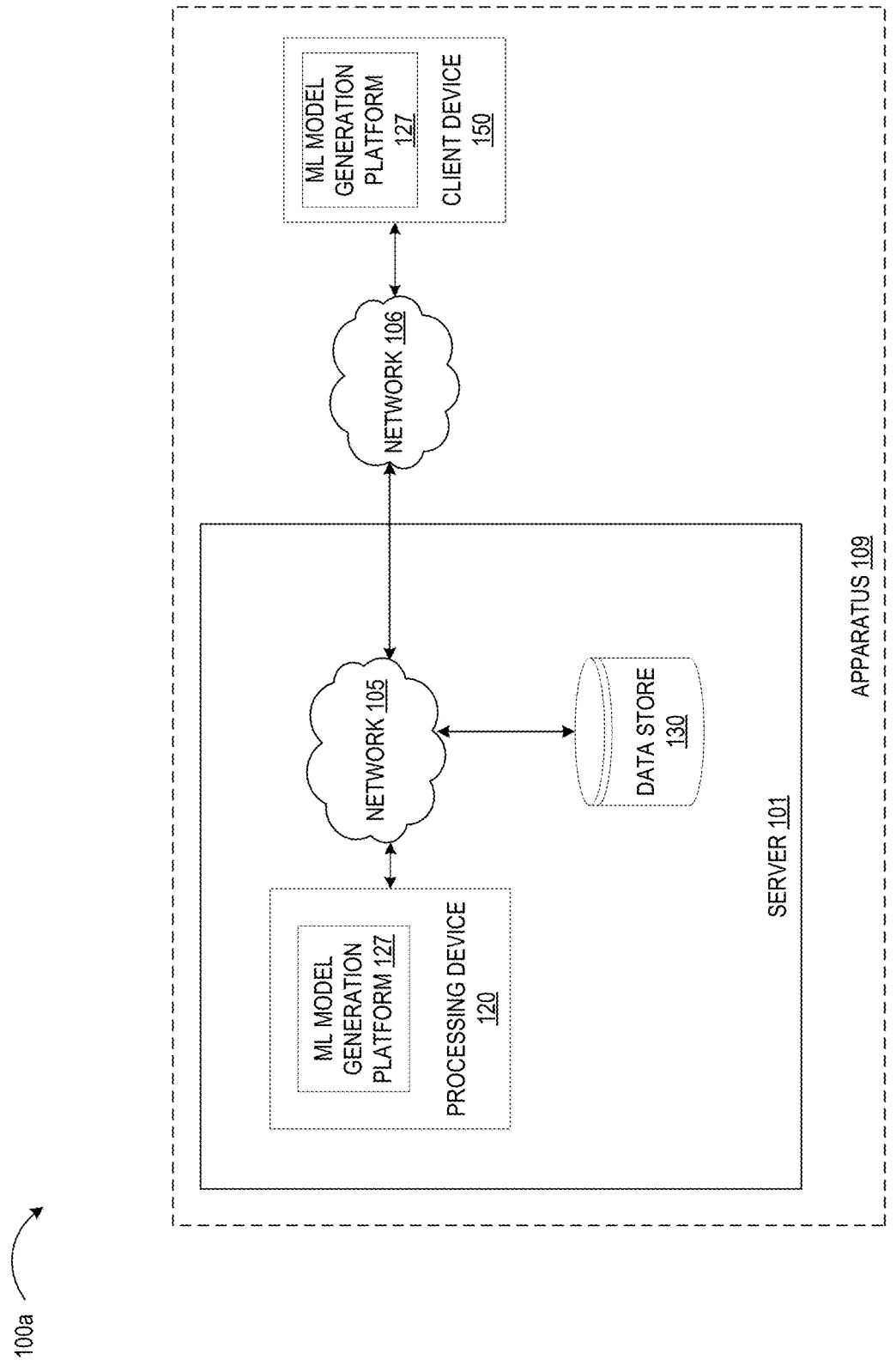
FIG. 1A is a block diagram that illustrates a first example system, in accordance with some embodiments of the present disclosure.

In various embodiments, machine learning (ML) is a category of computer algorithms that improve automatically (e.g., without human interaction and/or input) through experience. Machine learning may be seen as a subset of artificial intelligence (AI). Machine learning algorithms build a model based on sample data, known as "training data", in order to make predictions or decisions without being explicitly programmed to do so. Machine learning algorithms may be used in a wide variety of applications, such as email filtering and computer vision, where it is difficult or unfeasible to develop conventional algorithms to perform the needed tasks.

Performing machine learning operations involves creating a model, which is trained on some training data and then can process additional data to make predictions. Various types of models have been used and researched for machine learning systems. Types of models may include, for example, artificial neural networks, decision trees, support vector machines, regression analysis, Bayesian networks, and genetic algorithms.

Machine learning models may be categorized as either supervised or unsupervised. If the model is a supervised model, it may then be further sub-categorized as either a regression or classification model. In some embodiments, a variety of machine learning models that each perform an individual task may be combined together as subcomponents in a larger system, such that the combination accomplishes an operator or objective. The generation of a single machine learning model to accomplish a relatively simple objective can be a complicated and time consuming process. Such complication and time consumption are compounded when desired outcomes require multiple machine learning models working together.

Advantageously, the present embodiments provide for technical solutions to the above challenges, and others, by providing for a machine learning model generation platform, which may receive a description of a desired operator as an input, and provide one or more technical solutions, comprising one or more machine learning models, as outputs.

The variety of embodiments described herein provide the infrastructure for building and deploying portable and scalable end-to-end artificial intelligence (AI) solution workflows. The embodiments allow for end-to-end orchestration, enabling & simplifying the orchestration of full AI workflows (e.g., pipelines) during both training and inference (deployment). The embodiments further allow for easy experimentation—making it easy to try numerous ideas and techniques and manage various trials/experiments for hyperparameter tuning and benchmarking. The embodiments also allow for easy re-use—enabling the re-use of AI components and pipelines to quickly cobble together end-to-end solutions, without rebuilding each time.

Furthermore, the embodiments, described herein provide for an efficient way to package AI pipeline training jobs, which enables suppliers to easily package their AI pipeline training code and dependencies (e.g., as Docker images). A pipeline describes all of the components in an AI workflow and how they combine in graph form. In one embodiment, a pipeline component is a self-contained set of user code that may be packaged as an image for performing one step in the pipeline e.g. data preprocessing, data transformation, model training.

The embodiments also provide for an efficient way to train AI models in a hybrid cloud environment by providing a high-level API for training and automated tuning of AI models by efficiently running training jobs in the cloud, without needing to understand the underlying infrastructure. The embodiments also streamline the process of deploying a trained model, making it easy for customers to deploy trained models to a hybrid cloud environment as a prediction endpoint.

FIG. 1A is a block diagram that illustrates a first example system 100a, in accordance with some embodiments of the present disclosure. As discussed herein, ML generation platform 127 may include logic that enables the operations and systems described herein, when executed. In one embodiment, system 100a may be described as an apparatus 109, including means for performing the operations described herein (e.g., server 101, network 106, client device 150, etc.). In one embodiment, ML generation platform 127 resides in whole or in part on a server (e.g., server 101) of system 100a. In another embodiment, ML generation platform 127 resides in whole or in part on an edge network device, such as a client device (e.g., client device 150) of system 100a. In yet another embodiment, ML generation platform 127 resides in whole or in part on any combination of the two, or in a different system entirely.

Server 101 may include various components, which may allow ML generation platform 127 to run on a server device or client device. Each component may perform different functions, operations, actions, processes, methods, etc., for the embodiments described herein and/or may provide different services, functionalities, and/or resources for the embodiments described herein.

As illustrated in FIG. 1A, server 101 includes an ML generation platform 127, a computing processing device 120, a data store 130, and a network 105. The ML generation platform 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc. The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), graphics processing units (GPUs), etc.), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include ML generation platform 127, in addition to, or alternatively from, server 101.

Figure 1B:
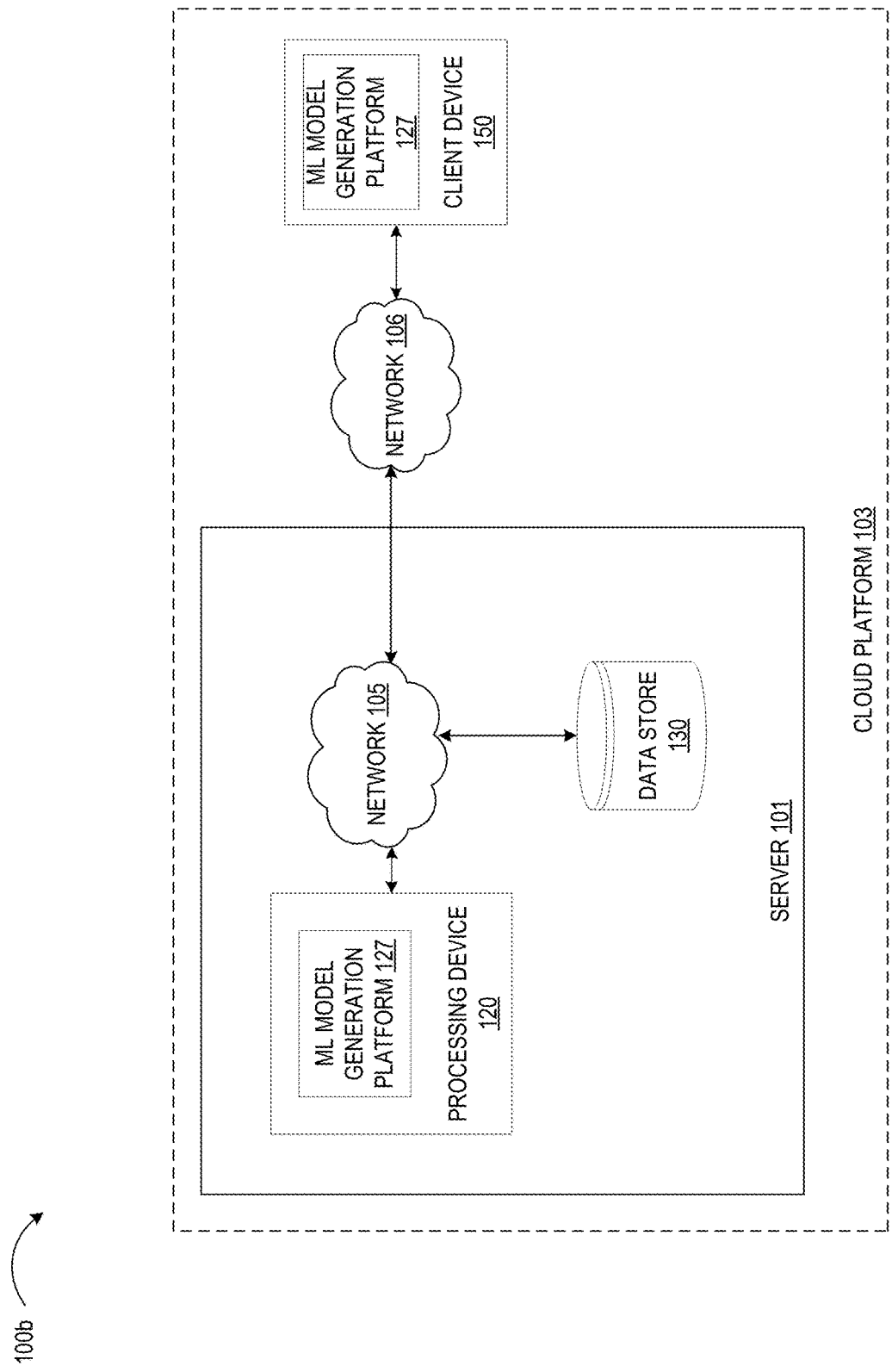
FIG. 1B is a block diagram that illustrates a second example system, in accordance with some embodiments of the present disclosure.

FIG. 1B is a block diagram that illustrates a second example system 100b, in accordance with some embodiments of the present disclosure. System 100b includes a cloud platform 103, which may include one or more components. As discussed herein, ML generation platform 127 may include logic that enables the operations and systems described herein, when executed. In one embodiment, system 100b may be described as a cloud platform 103, including means for performing the operations described herein (e.g., server 101, network 106, client device 150, etc.). In one embodiment, ML generation platform 127 resides in whole or in part on a server (e.g., server 101) of system 100b. In another embodiment, ML generation platform 127 resides in whole or in part on a client device (e.g., client device 150) of system 100b. In yet another embodiment, ML generation platform 127 resides in whole or in part on any combination of the two, or in a different system entirely.

Server 101 may include various components, which may allow ML generation platform 127 to run on a server device or client device. Each component may perform different functions, operations, actions, processes, methods, etc., for the embodiments described herein and/or may provide different services, functionalities, and/or resources for the embodiments described herein.

As illustrated in FIG. 1B, server 101 includes an ML generation platform 127, a computing processing device 120, a data store 130, and a network 105. The ML generation platform 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), graphical processing units (GPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include ML generation platform 127, in addition to, or alternatively from, server 101.

Figure 1C:
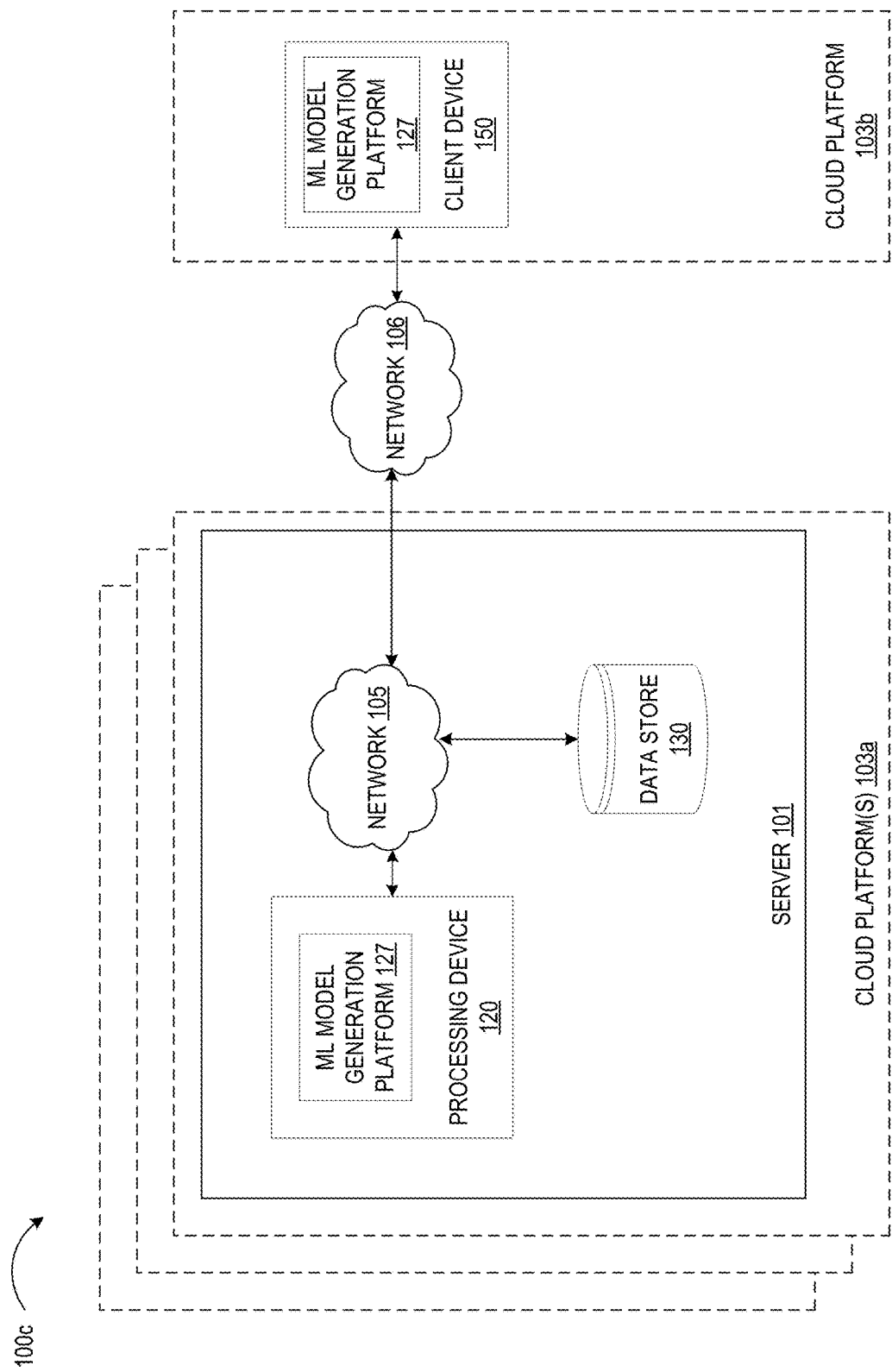
FIG. 1C is a block diagram that illustrates a third example system, in accordance with some embodiments of the present disclosure.

FIG. 1C is a block diagram that illustrates a third example system 100c, in accordance with some embodiments of the present disclosure. System 100b includes one or more cloud platforms 103a and 103b, which may include one or more components. As contemplated herein, cloud platforms 103, 103a, and/or 103b may represent any number of edge and/or central cloud platforms, which may include any number of components (e.g., edge and cloud applications, infrastructure services, workload orchestration components, virtualization components, operating system components, etc.).

As discussed herein, ML generation platform 127 may include logic that enables the operations and systems described herein, when executed. In one embodiment, system 100c may be described as a cloud platforms 103a and/or 103b, including means for performing the operations described herein (e.g., server 101, network 106, client device 150, etc.). In one embodiment, ML generation platform 127 resides in whole or in part on a server (e.g., server 101) of system 100c. In another embodiment, ML generation platform 127 resides in whole or in part on a client device (e.g., client device 150) of system 100c. In yet another embodiment, ML generation platform 127 resides in whole or in part on any combination of the two, or in a different system entirely.

Server 101 may include various components, which may allow ML generation platform 127 to run on a server device or client device. Each component may perform different functions, operations, actions, processes, methods, etc., for the embodiments described herein and/or may provide different services, functionalities, and/or resources for the embodiments described herein.

As illustrated in FIG. 1C, server 101 includes an ML generation platform 127, a computing processing device 120, a data store 130, and a network 105. The ML generation platform 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101 and/or between a variety of cloud platforms (e.g., 103a and 103b). The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include ML generation platform 127, in addition to, or alternatively from, server 101.

Figure 2:
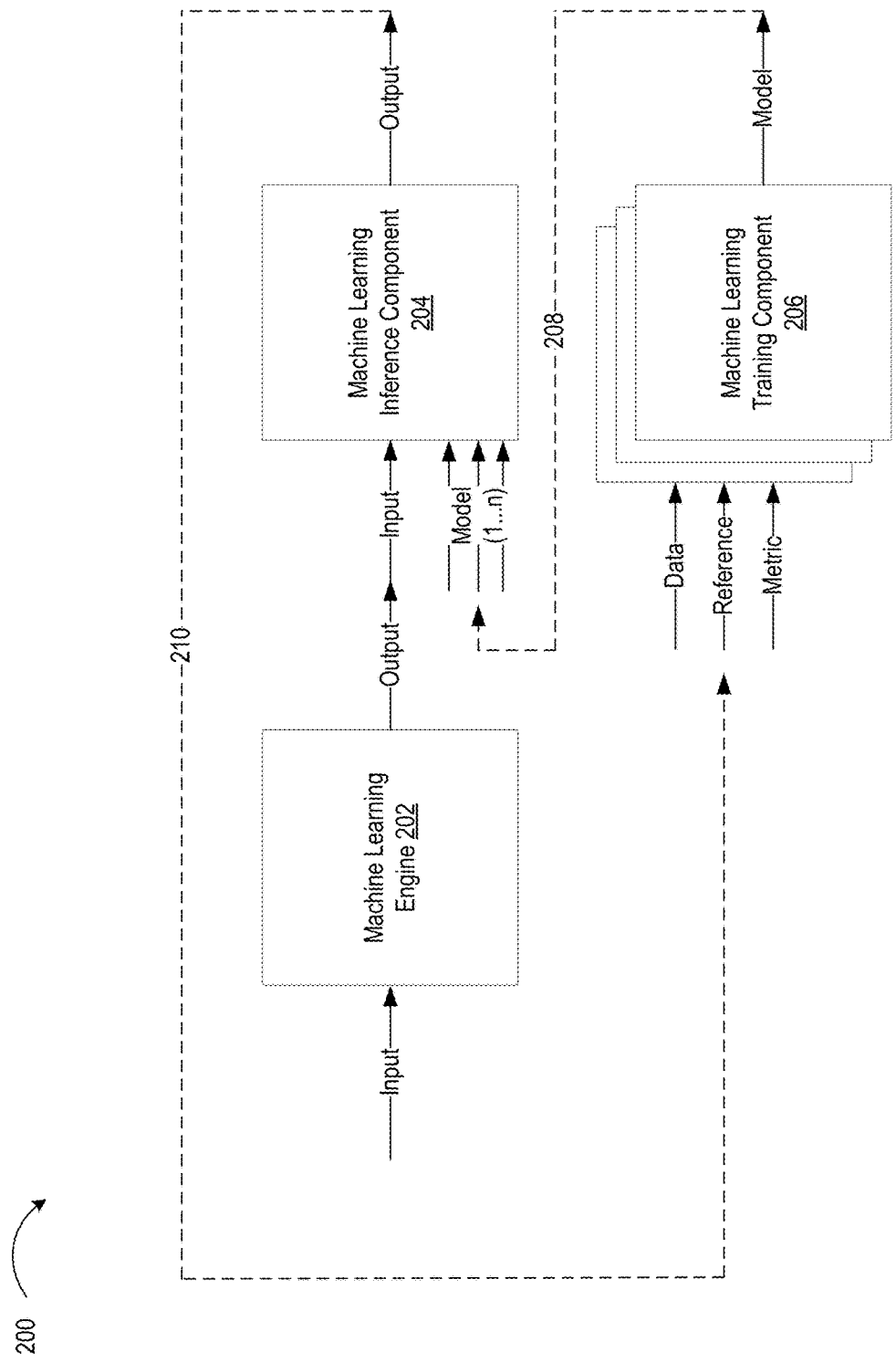
FIG. 2 is a block diagram illustrating a machine learning model generation platform, in accordance with some embodiments of the present disclosure.

FIG. 2 is a block diagram illustrating a machine learning model generation platform 200, in accordance with some embodiments of the present disclosure. FIG. 2 illustrates how a variety of machine learning components may be combined to form a machine learning model generation platform, as described herein. In one embodiment, video input is provided to a Machine Learning Engine 202. The Machine Learning Engine 202 outputs audio that is provided to a Machine Learning Interference Component 204. The Machine Learning Engine 202 also provides source separation by separating video from the audio, and provides video to Channel Merging (not shown). The Machine Learning Interference Component 204 provides speaker diarization by identifying speakers, and outputs respective speaker audio to a Machine Learning Training Component 206 such as a Speech Recognition Engine. The Machine Learning Training Component 206 converts speaker audio to text, and provides text as a Machine TXT Translation model signal 208 to the Machine Learning Inference Component 204. Within the Machine Leaning Inference Component 204 the Machine TXT Translation model signal 208, is translated from one language into another language (e.g., from English (EN) text to Italian (T) text, and is outputed as a Speech Synthesis signal 210. Speech Synthesis 210 signal is outputted as an audio in the other language (e.g., Italian) and is provided to be fed back either to the Machine Learning Training Component 206 to improve the Machine Learning Training Component 206's performance, or to the Channel Merging where the audio in the other language is merged and synced with the video received from the Machine Learning Language and output.

Though FIG. 2 illustrates input as being video, such input may also be an object, which may be the subject of manipulation or modification to achieve the description of a desired operator. For example, in one embodiment, the input may be an audio file containing audible speech in one language, to be translated to another language. In some embodiments, the present invention may process the input in any number of suitable ways, depending on the form and content of the input. For example, in one embodiment, the present invention may generate machine-readable data from a natural language input. In another embodiment, the present invention may generate a foreign translation of a description of a desired operator, as described herein.

In some embodiments, an operator is described as a function with the input format and the output format. An operator can also include attributes that further define the input and output. For example, input format can be audio and attributes that further define the input can be English and UK dialect. The pipeline in FIG. 2 may also include both a sequential and parallel path of operators. The output of one operator can be the input of one or more operators. The output of two or more operators may be combined as input to one operator.

Certain output may then be input into a machine learning inference component. In one embodiment, a ML inference component may use one or more trained machine learning models to make a recommendation and/or prediction. Such machine learning models may be provided directly to the ML inference component or be received as output from a machine learning training component.

ML training component may optionally receive the output of the ML inference component and, along with other information (e.g., data, references, metrics, etc.) generate new ML models or fine-tune existing ML models.

Figure 3:
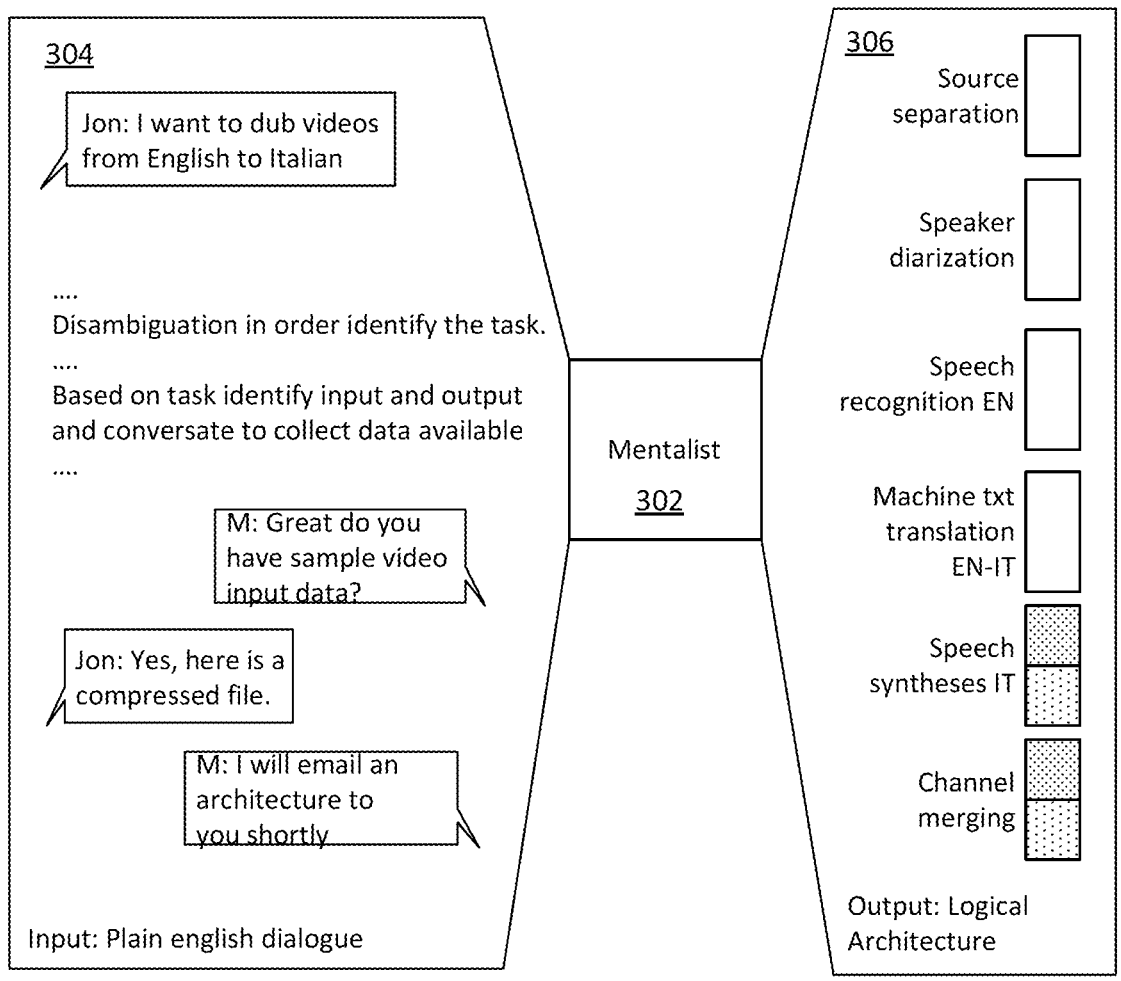
FIG. 3 is a block diagram illustrating a first component of a machine learning model generation platform, in accordance with some embodiments of the present disclosure.

FIG. 3 is a block diagram 300 illustrating a first component of a machine learning model generation platform, in accordance with some embodiments of the present disclosure. In one embodiment, the operations and components described with respect to FIG. 3 (e.g., "the Mentalist" 302) may be the first AI-powered virtual architect that empowers product owners to architect AI solutions without the need to have a deep understanding of artificial intelligence or machine learning.

In one embodiment, the Mentalist is a virtual assistant that product owners can onboard instantly inside their own team productivity environments, such as Slack®. Mentalist 302 may provide an AI solution architecture through understanding the product needs, the relevant product success metrics, and any data resource constraints (all of which may be parts of a desired operator). On one embodiment, the Mentalist 302 may eliminate or reduce the cost and time required to hire an expensive full-time AI/ML architect. A Mentalist-designed architecture may be presented in a simple way that anyone with elementary knowledge of AI can easily understand. Mentalist 302 can also respond to AI requests in natural language like "show me how to do speech dubbing" by providing links to example architectures. Product owners can rapidly architect alternative solutions mockups before making a final decision and commit to an implementation. Mentalist 302 provides recommended vendors, cost and delivery time estimates. Given the description of the input and output in plain English of the desired outcome, the Mentalist may generate a pipeline of operators that implements the desired outcome. The Mentalist may achieve this by translating the request of its user to a schema by using technology, comparable to machine translation technology, automated chatbot generators, and similar technology.

To find the most relevant operators, the Mentalist may use natural language processing to understand what operators are needed to accomplish the outcome desired. Part of finding the most relevant operators may, in some embodiments, include finding operators from a pre-existing database of operators. The database may tag operators with certain keywords to allow the Mentalist to more easily identify an operator. The database may also include pipelines of operators, in addition to elementary operators. The Mentalist may, in some embodiments, use these pipelines or similar pipelines as part of a "best" or "suggested" configuration to facilitate a desired outcome.

A variety of challenges exist in the current AI and ML fields. While AI becomes an essential part of many products, product management teams may be overwhelmed with requests for new feature developments (e.g., operators). An AI architect may be expensive to hire and is a challenge to find due to limited talent availability. The rapid ongoing developments in the AI and ML space may be hard to follow closely and require deep technical knowledge of ML in order to understand and evaluate the impact to their product's roadmap, their cost and effort for implementation. As a result of this complexity, AI-powered product features that may be crucial for the products to succeed and differentiate, are delayed in the product roadmaps.

Advantageously, the embodiments described herein overcome the above and other challenges by providing for a machine learning model generation platform, of which the Mentalist 302 may be a component. In a variety of embodiments, Mentalist 302 data may rely on thousands of model and AI/ML publications from internet sources, commercial AI/ML, and data suppliers in the platform's community. Mentalist 302 can be also deployed in third party applications, such as Slack, to engage product team members in a guided conversation that assists them to describe their project needs, objectives and key results systematically. It uses efficient, plug-and-play functional building blocks to synthesize solution architectures. It also generates a list of data sources required to train ML models when the customer's own data is not sufficient for the solution requested. Using measurements and knowledge from previously designed architectures, it provides the specified solution, the recommended vendors, time estimates and indications of off-the-shelf vs the need of custom built technology using available AI/ML resources.

Referring to FIG. 3, Mentalist 302 may receive a description 304 of a desired operator (e.g., a desired result, solution, etc.) as an input and generate a logical architecture (e.g., framework) 306 as an output. In one embodiment, the desired operator may have a variety of form factors. For example, in one embodiment, a desired operator may be described in natural language, via a conversation with a chat bot, for example. In another embodiment, the desired operator may be described in audible speech format. In some embodiments, the desired operator may be described via text (e.g. in communication in a chat bot). In other embodiments, the desired operator may be described in a more technical manner (e.g., via code). In each of these embodiments, and others, the Mentalist 302 may convert the description 304 into a machine-readable format. In one embodiment, a machine learning model may be used to aid in the translation. In other embodiments, other suitable methods may be employed.

Once in a machine-readable format, the Mentalist 302 may determine a logical architecture that describes a technical solution 306 to the desired operator. For example, the Mentalist 302 may determine one or more categories of machine learning models that may be combined to generate the desired operator. In the example illustrated in FIG. 3, the Mentalist 302 may analyze the natural language input 304, translate the natural language input 304 into a machine readable format, and determine that the desired operator is the dubbing of videos from English to Italian. In one embodiment, the Mentalist 302 may request additional information (e.g., sample video input data) to more accurately determine the desired operator.

After determining the desired operator, the Mentalist 302 may determine (e.g., using ML itself) that the operators of source separation, speaker diarization, speech recognition, machine text translation, speech synthesis, and channel merging ML models may be combined to generate the desired overall operator, which may be provided as an architecture output 306.

Figure 4:
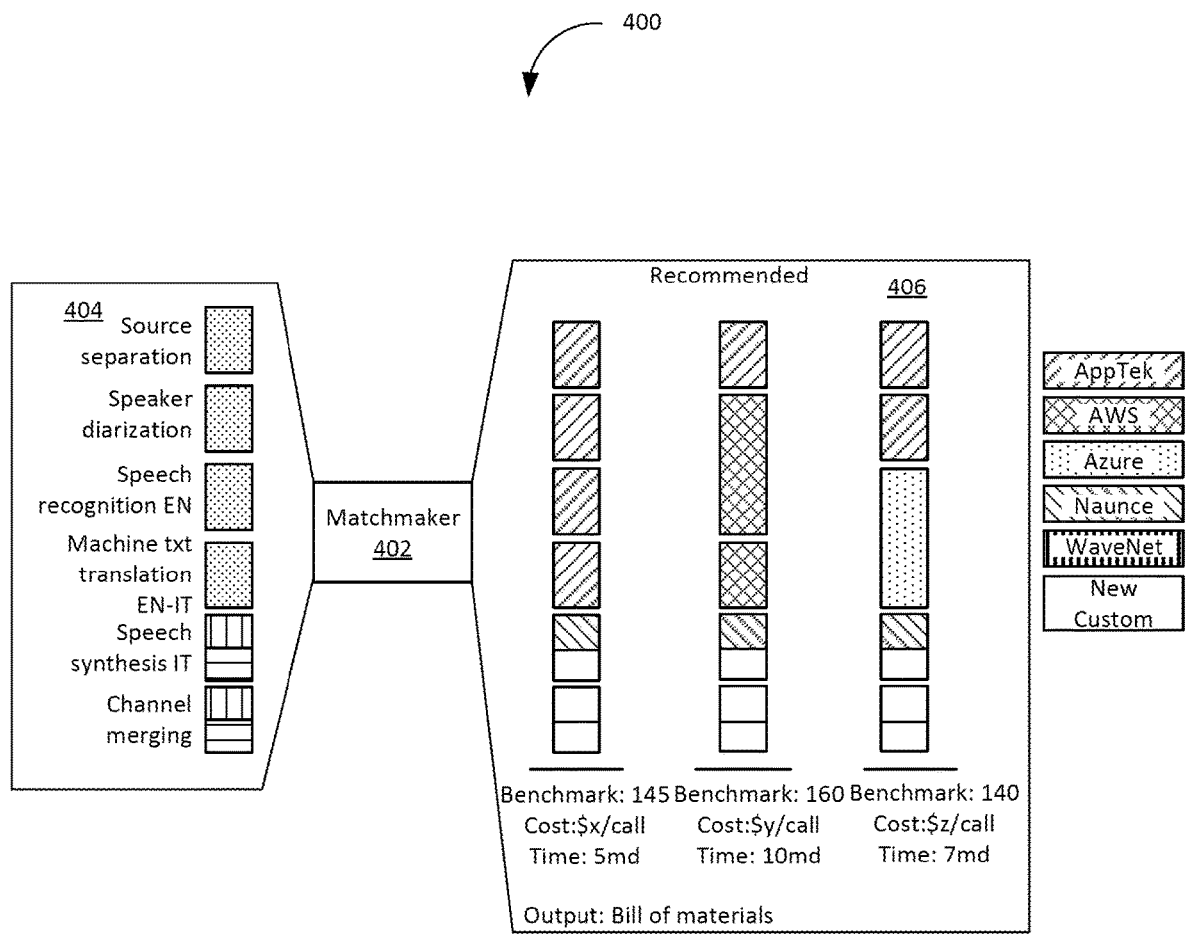
FIG. 4 is a block diagram illustrating a second component of a machine learning model generation platform, in accordance with some embodiments of the present disclosure.

FIG. 4 is a block diagram 400 illustrating a second component of a machine learning model generation platform, in accordance with some embodiments of the present disclosure. In one embodiment, the operations and components described with respect to FIG. 4 (e.g., "the Matchmaker" 402) may be a virtual AI implementer. As discussed herein, a variety of challenges exist in contemporary AI technologies and implementations.

Non-AI focused product development teams may not be able to afford to hire their own AI tech team. Product owners may not understand and don't have time to learn necessary AI implementation options. Furthermore, there is no trusted and single source of truth in the industry when it comes to performance and quality measurements, and this makes it difficult to make educated purchase decisions. Product owners may find it cumbersome to navigate multi-vendor chaos offerings for AI-based solutions to their technical problems.

Advantageously, Matchmaker 402 presents a recommended, well catalogued, bill of material that implements the blueprint (e.g., architecture 306) of the solution and matches the budget and metrics to any specified requirements. It includes an easy to understand description for each AI asset need with examples and a fair and single-number benchmark with explanation. Whenever needed, Matchmaker 402 may auto-procure non-existing assets (inference nodes, models, datasets) and connects the product owner with two or more recommended suppliers. In one embodiment, each asset may have least one swappable replacement option, if desired. Furthermore, Matchmaker 402 may execute the model and data isolation option, if requested. Matchmaker may also handle licensing aggregation and contract setup.

Advantageously, Matchmaker 402 provides a variety of benefits over existing technologies, including:
1. Generating the best implementation that fits the budget, quality and product success metrics
2. Eliminating the cost and time to hire AI develops specialists. The components of the solution are deployed automatically, and access is granted for verification in a fraction of time compared to other implementation options
3. One-stop-shop licensing, contract and payment model for the solution as a whole, instead of cluttered individual licensing and contracts from multiple vendors.

Referring to FIG. 4, Matchmaker receives an architecture 404 representing an AI-based solution to a desired operator, such as architecture 306 of FIG. 3. Based on the architecture 404, Matchmaker 402 generates one or more recommended AI-based solutions to the desired operator, using one or more machine learning models and other components to satisfy requirements of the architecture 404.

In one embodiment, Matchmaker 404 may determine a source for each of the models. Sources may include both data stores within the platform and data stores external to the platform, and may correspond to any number of suitable vendors. In one embodiment, matchmaker 404 may also determine when a new model needs to be created to satisfy a particular requirement of the architecture 404, such as when a suitable existing model does not exist or is not accessible. In such a case, Matchmaker 402 may send a request for the generating of the new model to users of the platform or third-party developers.

In one embodiment, Matchmaker 402 may provide estimates of benchmark data, costs, and time to build. Such data may be generated based on past knowledge of relative values for each model provided in the solution, or estimated using any number of statistical methods. Matchmaker 402 may provide any relevant information for display and selection (e.g., purchase) on the platform.

Figure 5A:
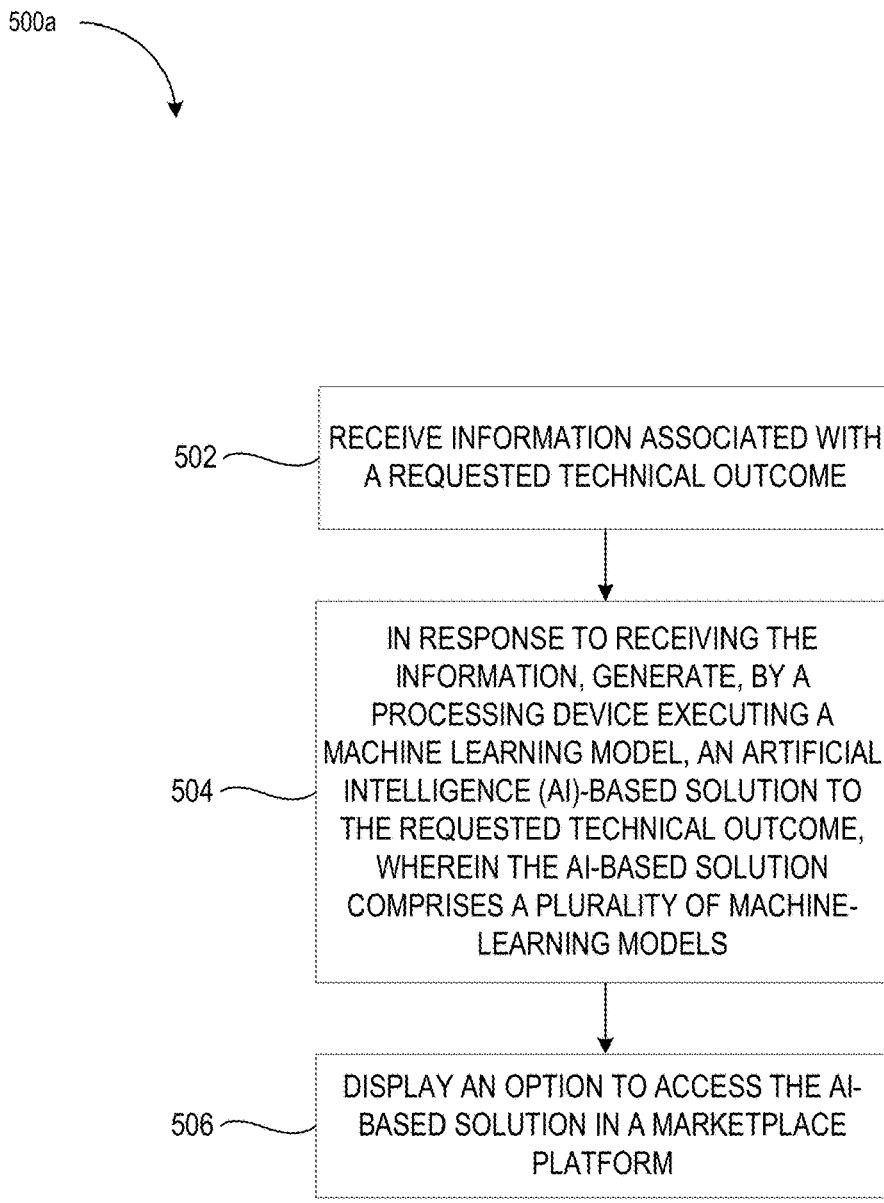
FIG. 5A is a flow diagram of a first method of a machine learning model generation platform, in accordance with some embodiments of the present disclosure.

FIG. 5A is a flow diagram of a first method 500*a* of a machine learning model generation platform, in accordance with some embodiments of the present disclosure. The method 500*a* may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIGS. 1A-C, 2, 3, and/or 4 may perform one or more of the following operations. For example, in one embodiment, processing logic of ML model generation platform 127 performs the following operations, with respect to the individual components of FIG. 1A-C. In another embodiment, any other suitable processing device or logic may perform the described operations.

Referring to FIG. 5A, at block 502, processing logic may receive information associated with a requested operator. In one embodiment, an operator is a technical problem to be solved through the use of AI. In one embodiment, information associated with the requested operator may include, but is not limited to, natural language text, computer code, audio, video, etc. In the case for which the information is in natural language, processing logic may further generate, based on a machine learning model, one or more computer-recognizable commands from the natural language generating an architecture of the AI-based solution based on the plurality of computer-recognizable commands. This is further described with respect to FIG. 3.

In response to receiving the information, processing logic at block 504 may generate (e.g., by a processing device executing a machine learning model) an artificial intelligence (AI)-based solution to the requested operator. In one embodiment, the AI-based solution includes a one or more (e.g., a plurality of) machine-learning models.

At block 506, processing logic may display, or provide for display, an option to access (e.g., purchase) the AI-based solution in a marketplace platform. In one embodiment, to generate the AI-based solution, processing logic may perform a variety of operations. For example, processing logic may identify a first machine learning model in a first database within the marketplace platform, wherein the first machine learning model is a first portion of the AI-based solution and identify a second machine learning model in a second database external to the marketplace platform, wherein the second machine learning model is a first portion of the AI-based solution. Processing logic may further generate the AI-based solution by combining the first machine learning model and the second machine learning model.

In one embodiment, processing logic may further determine that a third portion of the AI-based solution does not exist in the first database and the second database and provide a request for generation of a third machine learning model to the AI marketplace platform in response to the determining. Processing logic may subsequently receive the third machine learning model in response to the providing the request, wherein the third machine learning model is the third portion of the AI-based solution. The AI-based solution may then be generated by combining the third machine learning model with the first machine learning model and the second machine learning model.

In one embodiment, processing logic may optionally generate a benchmark for the AI-based solution (e.g., by combining known benchmarks for models included in the solution or generating benchmark estimates based on similar models) and display the benchmark with the option to access the AI-based solution in the marketplace platform.

In one embodiment, processing logic may generate a plurality of (e.g., two or more) AI-based solutions to the requested operator and display a plurality of options to access the plurality of AI-based solutions in the marketplace platform. Processing logic may optionally additionally provide a plurality of characteristics of the plurality of AI-based solutions (benchmark values, approximate costs, time expectation for the building of the solution, etc.). Processing logic may further receive a selection identifying one of the plurality of AI-based solutions and, in response to receiving the selection, provide access to the one of the AI-based solutions. Processing logic may further receive an authorization to add one of the AI-based solutions to the AI marketplace platform and, in response to receiving the authorization, providing the one of the AI-based solutions in the AI marketplace platform for future execution (e.g., under a licensing agreement).

In one embodiment, the information corresponds to a process, and processing logic may further determine, by a machine learning model, a modification to the process based on the information and generate a modified process based on the modification. For example, a process may include receiving video of a public throughway and identifying faces. Processing logic may further determine, by a machine learning model, a modification to the identification of faces, and generate a modified process that has an improved ability to detect faces in a low lighting environment.

Figure 5B:
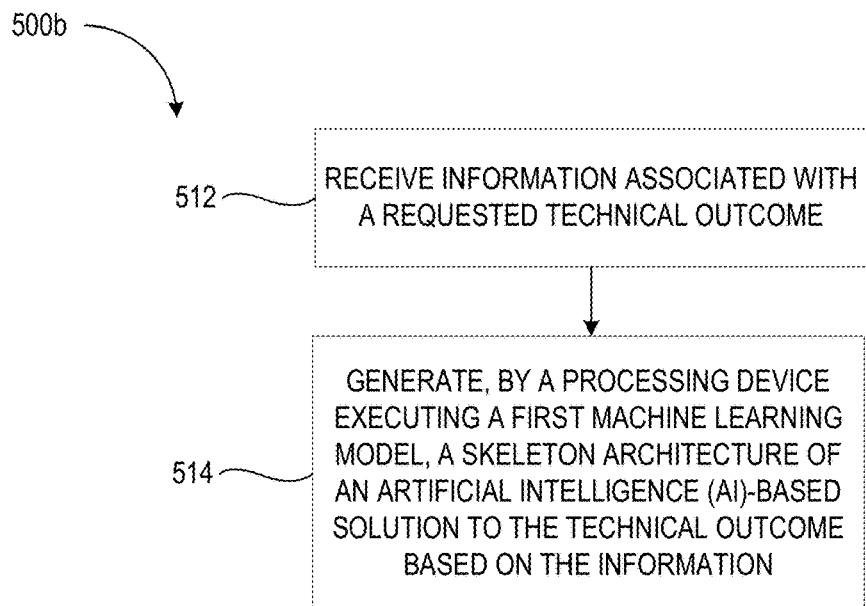
FIG. 5B is a flow diagram of a second method of a machine learning model generation platform, in accordance with some embodiments of the present disclosure.

FIG. 5B is a flow diagram of a second method 500*b* of a machine learning model generation platform, in accordance with some embodiments of the present disclosure. The method 500*b* may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIGS. 1A-C, 2, 3, and/or 4 may perform one or more of the following operations. For example, in one embodiment, processing logic of ML model generation platform 127 performs the following operations, with respect to the individual components of FIG. 1A-C. In another embodiment, any other suitable processing device or logic may perform the described operations.

Referring to FIG. 5B, at block 512, processing logic may receive information associated with a requested operator. In one embodiment, the information associated with the requested operator is in natural language, and processing logic may generate, based on a second machine learning model, a plurality of computer-recognizable commands from the natural language. Processing logic may further generate the skeleton architecture of the AI-based solution based on the plurality of computer-recognizable commands.

At block 514, processing logic may generate (e.g., by a processing device executing a first machine learning model)

a skeleton architecture of an artificial intelligence (AI)-based solution to the operator based on the information. In one embodiment, the skeleton architecture includes a plurality of machine learning model categories, each category corresponding to an intermediate objective of the AI-based solution. In another embodiment, the AI-based solution includes a plurality of machine-learning models, each model corresponding to a category of the skeleton architecture.

Optionally, processing logic may generate the AI-based solution to the requested operator, based on the skeleton architecture, and display (or provide for display) an option to access the AI-based solution in a marketplace platform. In one embodiment, to generate the AI-based solution the processing logic may: identify a second machine learning model in a first database within the marketplace platform, wherein the second machine learning model is a first portion of the AI-based solution; identify a third machine learning model in a second database external to the marketplace platform, wherein the third machine learning model is a second portion of the AI-based solution; and generate the AI-based solution by combining the second machine learning model and the third machine learning model.

In one embodiment, the information corresponds to a process, and processing logic may further determine, by a machine learning model, a modification to the process based on the information and generate a modified process based on the modification.

Figure 5C:
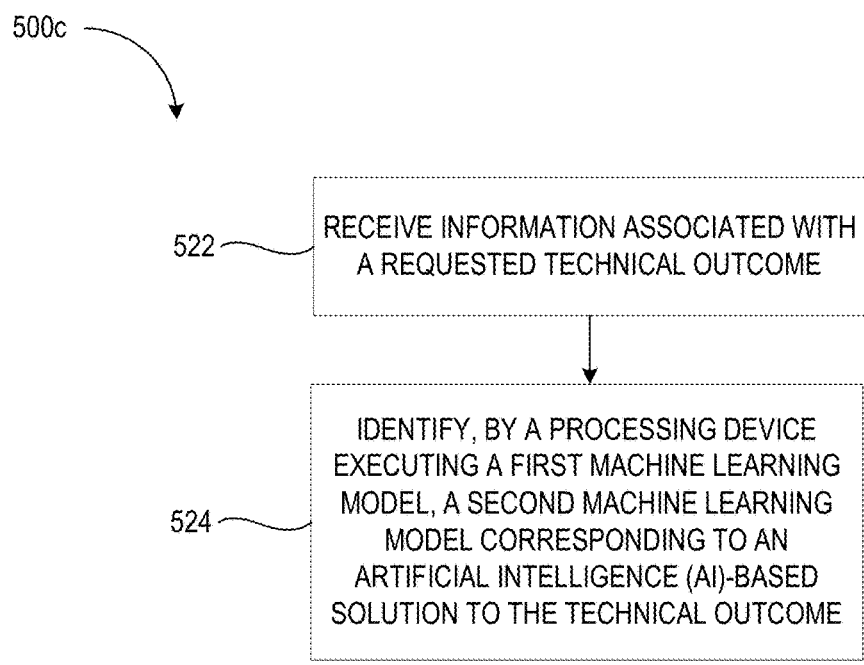
FIG. 5C is a flow diagram of a third method of a machine learning model generation platform, in accordance with some embodiments of the present disclosure.

FIG. 5C is a flow diagram of a third method 500c of a machine learning model generation platform, in accordance with some embodiments of the present disclosure. The method 500c may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIGS. 1A-C, 2, 3, and/or 4 may perform one or more of the following operations. For example, in one embodiment, processing logic of ML model generation platform 127 performs the following operations, with respect to the individual components of FIG. 1A-C. In another embodiment, any other suitable processing device or logic may perform the described operations.

Referring to FIG. 5C, at block 522, processing logic may receive information associated with a requested operator. At block 524, processing logic may identify (e.g., by a processing device executing a first machine learning model) a second machine learning model corresponding to an artificial intelligence (AI)-based solution to the operator. In one embodiment, to identify the second ML model, processing logic may determine that the second machine learning model is capable of accomplishing an objective of the requested operator.

In one embodiment, the second machine learning model is a first portion of the AI-based solution, and processing logic may: identify a third machine learning model, wherein the second machine learning model is a second portion of the AI-based solution; generate the AI-based solution by combining the first machine learning model and the second machine learning model; and display (or provide for display) an option to access the AI-based solution in a marketplace platform. Optionally, the second model may be identified in a first database of the marketplace platform and the third model may be identified in a second database external to the marketplace platform.

In another embodiment, processing logic may determine that a third portion of the AI-based solution does not exist in the first database and the second database. In this case, processing logic may further provide a request for generation of a fourth machine learning model to the AI marketplace platform in response to the determining and receive the fourth machine learning model in response to the providing the request, wherein the fourth machine learning model is the third portion of the AI-based solution. Processing logic may further generate the AI-based solution by combining the fourth machine learning model with the second machine learning model and the third machine learning model.

Optionally, processing logic may generate a skeleton architecture of the artificial intelligence (AI)-based solution to the operator based on the information, wherein the second machine learning model corresponds to a category of the skeleton model. In another embodiment, the information corresponds to a process, and processing logic may further determine, by a machine learning model, a modification to the process based on the information and generate a modified process based on the modification.

Figure 6:
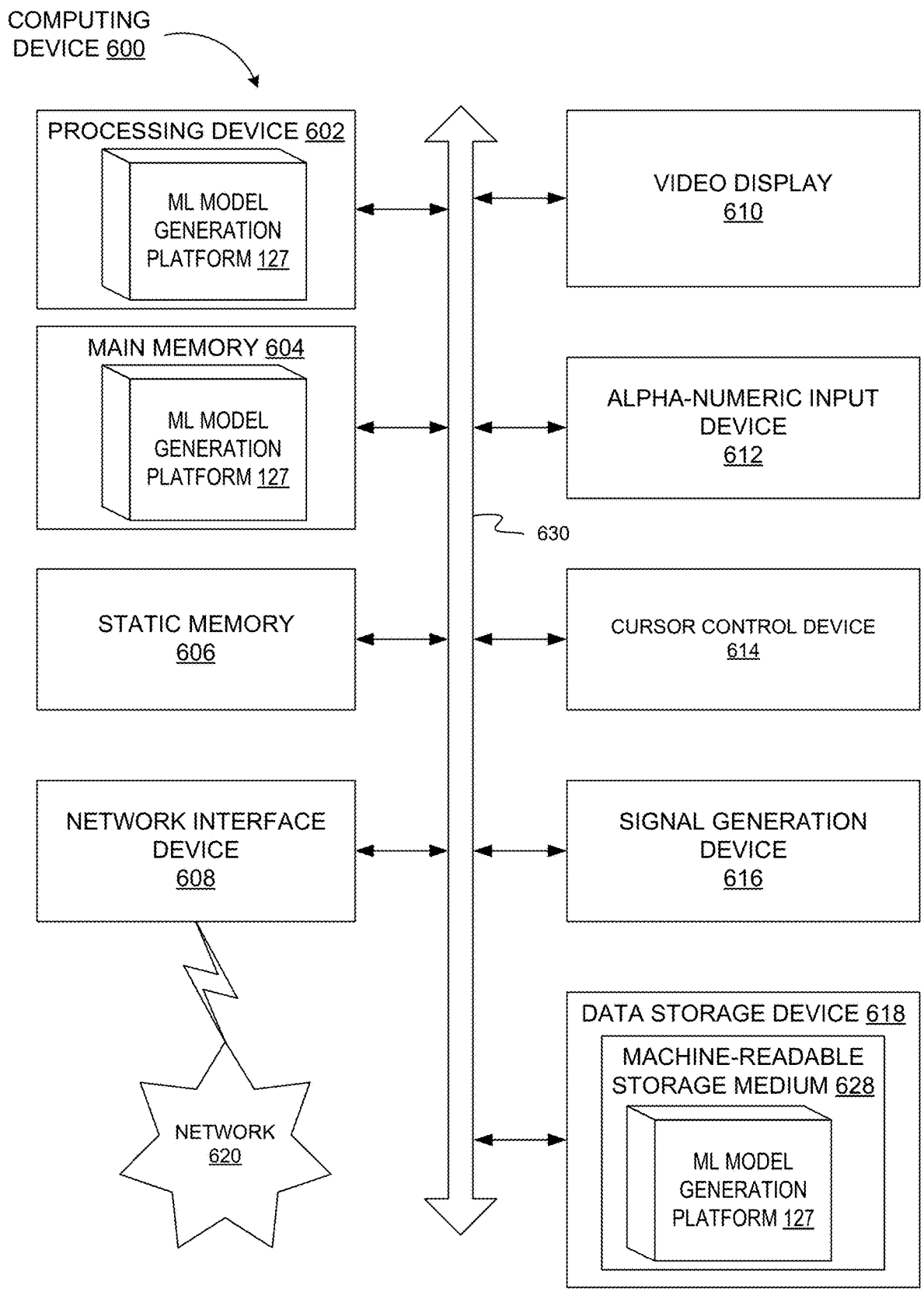
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments of the present disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein. In one embodiment, processing device 602 represents processing device 120 of FIG. 1A. In another embodiment, processing device 602 represents a processing device of a client device (e.g., client device 150 of FIG. 1A).

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions, e.g., instructions for carrying out the operations described herein, in accordance with one or more aspects of the present disclosure. Instructions implementing ML generation platform 127 may also reside, completely or at least partially, within main memory 604 and/or within processing device 602 during execution thereof by computing device 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Though the above has been described with reference to machine learning and artificial intelligence related operators, it should be understood that operators are not confined to such fields. For example, operators may include steps in a recipe. A user may ask the Mentalist "how do I make soup?" and the Mentalist may understand from the request that it should search a recipe database. The Mentalist may then identify "operators" for this request, such as "time to cook" or "ingredients needed." The current invention is equally applicable to fields where natural language questions can be broken down into separate components, and assigned operators to facilitate a desired solution.

In some embodiments, a method in accordance with some embodiments of the present invention includes receiving information associated with a requested operator, in response to receiving the information, generating, by a processing device executing a machine learning model, an artificial intelligence (AI)-based solution to the requested operator, wherein the AI-based solution comprises a plurality of machine-learning models, and displaying an option to access the AI-based solution in a marketplace platform.

In some embodiments, a method in accordance with some embodiments of the present invention includes receiving information associated with a requested operator, and generating, by a processing device executing a first machine learning model, a skeleton architecture of an artificial intelligence (AI)-based solution to the operator based on the information.

In some embodiments, a method in accordance with some embodiments of the present invention includes receiving information associated with a requested operator, and identifying, by a processing device executing a first machine learning model, a second machine learning model corresponding to an artificial intelligence (AI)-based solution to the operator.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving information associated with a requested operator;
   generating, by a processing device executing a first machine learning model, a skeleton architecture of an artificial intelligence (AI)-based solution to the operator based on the information;
   generating the AI-based solution to the requested operator, based on the skeleton architecture, wherein the generating of the AI-based solution comprises:
      identifying a second machine learning model in a first database within the marketplace platform, wherein the second machine learning model is a first portion of the AI-based solution,
      identifying a third machine learning model in a second database external to the marketplace platform, wherein the third machine learning model is a second portion of the AI-based solution, and
      generating the AI-based solution by combining the second machine learning model and the third machine learning model; and
   displaying an option to access the AI-based solution in a marketplace platform.

2. The method of claim 1, wherein the information associated with the requested operator is in natural language, the method further comprising:
   generating, based on a second machine learning model, a plurality of computer-recognizable commands from the natural language; and
   generating the skeleton architecture of the AI-based solution based on the plurality of computer-recognizable commands.

3. The method of claim 1, wherein the skeleton architecture comprises a plurality of machine learning model categories, each category corresponding to an intermediate objective of the AI-based solution.

4. The method of claim 3, wherein the AI-based solution comprises a plurality of machine-learning models, each model corresponding to a category of the skeleton architecture.

5. The method of claim 1, wherein the information corresponds to a process, the method further comprising:
   determining, by a machine learning model, a modification to the process based on the information; and
   generating a modified process based on the modification.

6. A system, comprising:
   a memory to store information associated with a requested operator; and
   a processing device, operatively coupled the memory, the processing device to:
      receive the information associated with the requested operator;
      generate, by a first machine learning model, a skeleton architecture of an artificial intelligence (AI)-based solution to the operator based on the information;
      generate the AI-based solution to the requested operator, based on the skeleton architecture, wherein to generate the AI-based solution the processing device is further configured to:
         identify a second machine learning model in a first database within the marketplace platform, wherein the second machine learning model is a first portion of the AI-based solution,
         identify a third machine learning model in a second database external to the marketplace platform, wherein the third machine learning model is a second portion of the AI-based solution, and
         generate the AI-based solution by combining the second machine learning model and the third machine learning model; and
      display an option to access the AI-based solution in a marketplace platform.

7. The system of claim 6, wherein the information associated with the requested operator is in natural language, the processing device further to:
   generate, based on a second machine learning model, a plurality of computer-recognizable commands from the natural language; and
   generate the skeleton architecture of the AI-based solution based on the plurality of computer-recognizable commands.

8. The system of claim 6, wherein the skeleton architecture comprises a plurality of machine learning model categories, each category corresponding to an intermediate objective of the AI-based solution.

9. The system of claim 8, wherein the AI-based solution comprises a plurality of machine-learning models, each model corresponding to a category of the skeleton architecture.

10. The system of claim 6, wherein the information corresponds to a process, the processing device further to:
   determine, by a machine learning model, a modification to the process based on the information; and
   generate a modified process based on the modification.

11. A non-transitory computer-readable storage medium storing instructions which, when executed by a processing device, cause the processing device to:
   receive information associated with a requested operator;
   generate, by the processing device executing a first machine learning model, a skeleton architecture of an artificial intelligence (AI)-based solution to the operator based on the information;
   generate the AI-based solution to the requested operator, based on the skeleton architecture, wherein to generating the AI-based solution the processing device is further configured to:
      identify a second machine learning model in a first database within the marketplace platform, wherein the second machine learning model is a first portion of the AI-based solution;
      identify a third machine learning model in a second database external to the marketplace platform, wherein the third machine learning model is a second portion of the AI-based solution; and
      generate the AI-based solution by combining the second machine learning model and the third machine learning model; and
   display an option to access the AI-based solution in a marketplace platform.

12. The non-transitory computer-readable storage medium of claim 11, wherein the information associated with the requested operator is in natural language, the processing device further to:
   generate, based on a second machine learning model, a plurality of computer-recognizable commands from the natural language; and
   generate the skeleton architecture of the AI-based solution based on the plurality of computer-recognizable commands.

13. The non-transitory computer-readable storage medium of claim 11, wherein the skeleton architecture comprises a plurality of machine learning model categories, each category corresponding to an intermediate objective of the AI-based solution.

14. The non-transitory computer-readable storage medium of claim 13, wherein the AI-based solution comprises a plurality of machine-learning models, each model corresponding to a category of the skeleton architecture.

* * * * *